(12) United States Patent
Kshirsagar et al.

(10) Patent No.: US 8,316,226 B1
(45) Date of Patent: Nov. 20, 2012

(54) ADAPTIVE TRANSITION BETWEEN LAYER THREE AND LAYER FOUR NETWORK TUNNELS

(75) Inventors: Shekhar Kshirsagar, San Jose, CA (US); James Wood, San Jose, CA (US); David W. Young, San Francisco, CA (US); Vamsi K. Anne, San Jose, CA (US); Vadim Egorov, Palo Alto, CA (US); Christopher N. Thomas, Watsonville, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1278 days.

(21) Appl. No.: 11/226,501

(22) Filed: Sep. 14, 2005

(51) Int. Cl.
*H04L 29/06* (2006.01)
*G06F 15/16* (2006.01)

(52) U.S. Cl. ............... 713/150; 713/151; 726/3; 726/15

(58) Field of Classification Search .......... 713/150–153, 713/158; 726/2–3, 11–15, 22–23; 709/227–230, 709/234–235, 238–242
See application file for complete search history.

(56) References Cited

U.S. PATENT DOCUMENTS

| | | | |
|---|---|---|---|
| 6,473,863 B1 * | 10/2002 | Genty et al. ..................... 726/3 |
| 6,675,225 B1 * | 1/2004 | Genty et al. ................. 709/245 |
| 6,751,190 B1 * | 6/2004 | Swallow ........................ 370/217 |
| 6,915,436 B1 * | 7/2005 | Booth et al. ...................... 726/3 |
| 7,673,048 B1 * | 3/2010 | O'Toole et al. ............... 709/226 |
| 2002/0152320 A1 * | 10/2002 | Lau ................................ 709/238 |
| 2003/0088698 A1 * | 5/2003 | Singh et al. ................... 709/239 |
| 2003/0177396 A1 * | 9/2003 | Bartlett et al. ................ 713/201 |
| 2004/0225895 A1 * | 11/2004 | Mukherjee et al. ........... 713/201 |
| 2004/0268142 A1 * | 12/2004 | Karjala et al. ................ 713/200 |
| 2005/0021844 A1 * | 1/2005 | Puon et al. .................... 709/238 |
| 2005/0125542 A1 * | 6/2005 | Zhu ............................... 709/227 |
| 2005/0185644 A1 * | 8/2005 | Tsuji et al. .................... 370/389 |
| 2006/0185012 A1 * | 8/2006 | Olivereau et al. .............. 726/14 |
| 2006/0230446 A1 * | 10/2006 | Vu .................................. 726/15 |
| 2006/0282889 A1 * | 12/2006 | Brown et al. ................... 726/15 |
| 2007/0094723 A1 * | 4/2007 | Short et al. ..................... 726/14 |
| 2010/0278181 A1 * | 11/2010 | Liu et al. ....................... 370/392 |

* cited by examiner

*Primary Examiner* — Darren B Schwartz
(74) *Attorney, Agent, or Firm* — Shumaker & Sieffert, P.A.

(57) ABSTRACT

Adaptive failover occurs between a Layer Three (L3) based network tunnel and a Layer Four (L4) based network tunnel. An example of a L4 based network tunnel is a Secure Sockets Layer (SSL) tunnel and an example of a L3 based network tunnel is an Internet Protocol Security (IPSec) tunnel. SSL tunnels work through most firewalls and proxies, but may introduce latency and other performance problems. IPSec tunnels provide a more efficient performance, but may not work through some firewalls and proxies. The techniques include dynamically selecting a tunneling protocol in order to achieve a more efficient network tunnel performance when possible while maintaining consistent L3 connectivity from a variety of remote network environments.

28 Claims, 7 Drawing Sheets

ADAPTIVE TRANSITION BETWEEN LAYER THREE AND LAYER FOUR NETWORK TUNNELS

TECHNICAL FIELD

The principles of the invention relate to computer networks and, more particularly, to network tunnels established over computer networks.

BACKGROUND

A computer network is a collection of interconnected computing devices that exchange data and share resources. In a packet-based network the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Network tunnels, such as virtual private networks (VPNs), are often used to securely share data over a public network infrastructure, such as the Internet. For example, an enterprise that includes multiple geographically separated sites, each site including one or more computing devices, may establish a VPN to allow the computing devices to securely communicate through the Internet or another public network infrastructure.

A number of communication protocols have been developed for establishing a VPN. In general, these protocols allow network devices to establish the VPN as one or more secure data flows across the public network infrastructure. For example, Internet Protocol Security (IPSec) protocols and Secure Sockets Layer (SSL) protocols make use of cryptographic technology to establish network tunnels. These tunnels allow packets conforming to other network protocols, such as Internet Protocol (IP) packets, to be encapsulated within encrypted packet streams flowing between the sites.

SSL VPN implementations tunnel IP packets on top of a Layer 4 connection oriented protocol, e.g., Transmission Control Protocol (TCP). The TCP inherently introduces latency and performance problems within the SSL VPN tunnel. However, firewalls typically recognize SSL packets and allow the SSL VPN to work through the firewalls. Moreover, SSL VPNs can also work through proxies.

In contrast, IPSec VPN implementations tunnel encrypted IP packets, i.e., Encapsulation Security Payload (ESP) packets, on top of a connection-less protocol, e.g., IP or User Datagram Protocol (UDP). IP and UDP do not suffer the performance drawbacks of TCP. However, IPSec VPNs cannot work though some firewalls, which may cause the firewalls to drop IPSec packets. Additionally, IPSec VPNs cannot work in restricted internet access scenarios where internet access is only available through a proxy. For these and other reasons, selection of a tunneling protocol for use with a VPN can be a challenging task.

SUMMARY

In general, the principles of the invention relate to techniques for adaptively failing over between a Layer Three (L3) based network tunnel and a Layer Four (L4) based network tunnel. A network tunnel may be established between a user device and a remote private network, e.g., a corporate network, to allow secure communication through a public network, such as the Internet. For example, a network tunnel may comprise a virtual private network (VPN) tunnel. The techniques include dynamically selecting a tunneling protocol in order to achieve a more efficient network tunnel performance when possible while maintaining consistent L3 connectivity from a variety of remote network environments.

An example of a L4 based network tunnel is a Secure Sockets Layer (SSL) tunnel that works through most firewalls and proxies, but may introduce latency and other performance problems. An example of a L3 based network tunnel is an Internet Protocol Security (IPSec) tunnel that provides efficient performance, but may not work through some firewalls and proxies. The principles of the invention may be applied to user devices with various operating systems, such as WINDOWS, LINUX or MACINTOSH operating systems. A user device may comprise any network-enabled device, such as a desktop computer, a laptop, a workstation, a personal digital assistant (PDA), a wireless device, a network-ready appliance, a file server, a print server, or another device.

For example, a client within a user device may establish both a SSL tunnel and an IPSec tunnel between the user device and a corporate network. The client issues test or "keep-alive" messages over the IPSec tunnel to determine whether L3 packets, e.g., Internet Protocol (IP) packets, can successfully reach the corporate network. While the IPSec communication is successful, the client utilizes the more efficient L3 based tunnel.

When the VPN client does not receive a reply to the test messages, the client fails over to the L4 based tunnel, i.e., the SSL tunnel in this example. The client may continue to issue test messages over the IPSec tunnel in order to transition back to the IPSec tunnel once L3 connectivity is reestablished. In this way, the client provides a user with a network tunnel that is appropriate for a given remote network environment without the user's knowledge.

In one embodiment, a method comprises establishing a layer three (L3) based tunnel and a layer four (L4) based tunnel over a network. The method further comprises determining whether communication with the L3 based tunnel through the network is successful, and dynamically transitioning between the L3 based tunnel and the L4 based tunnel based on the determination.

In another embodiment, a computer-readable medium comprises instructions that cause a programmable processor to establish a layer three (L3) based tunnel and a layer four (L4) based tunnel over a network. The instructions also cause the programmable processor to determine whether communication with the L3 based tunnel through the network is successful, and dynamically transition between the L3 based tunnel and the L4 based tunnel based on the determination.

In another embodiment, a device comprises a client that establishes a layer three (L3) based tunnel and a layer four (L4) based tunnel over a network. Furthermore, the client determines whether communication with the L3 based tunnel through the network is successful, and dynamically transitions between the L3 based tunnel and the L4 based tunnel based on the determination.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
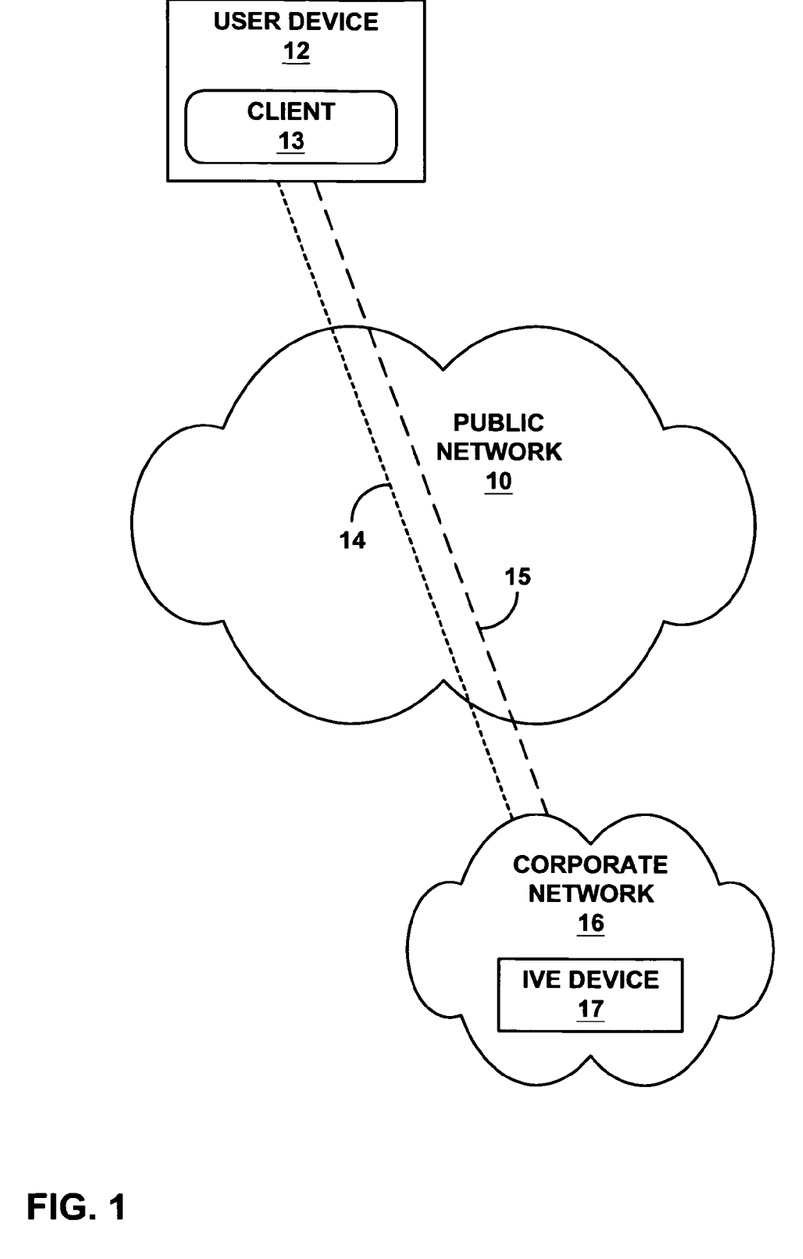
FIG. 1 is a block diagram illustrating a computer system in which a client within a user device dynamically selects a tunneling protocol based on a remote network environment.

FIG. 1 is a block diagram illustrating a computer system in which a client 13 within a user device 12 dynamically selects a tunneling protocol based on a remote network environment. Client 13 provides a user with a network tunnel that is appropriate for a given remote network environment without the user's knowledge. As illustrated in FIG. 1, a network tunnel, such as a virtual private network (VPN) may be established between user device 12 and a corporate network 16, to provide secure L3 connectivity over a public network 10, such as the Internet. In other embodiments, a network tunnel may be established between user device 12 and any remote private network. For purposes of illustration, the network tunnel will be described herein as a VPN tunnel. However, the invention should not be limited in this respect. For example, principles of the invention could be implemented within any of a variety of network tunnels without departing from the scope of the invention.

User device 12 may comprise a desktop computer, a laptop, a workstation, a PDA, a wireless device, a network-ready appliance, a file server, a print server, or another device. For example, user device 12 may comprise a PC or a MACINTOSH computing platform. Client 13 may comprise a software client running on user device 12. Client 13 may comprise, for example, either a PC VPN client that is fully integrated with the WINDOWS operating system or a Mac VPN client that is fully integrated with the MACINTOSH operating system.

A processor within user device 12, such as a general purpose processor, may execute instructions stored in a computer-readable medium to perform various functions of client 13 described herein. Exemplary computer-readable media may include or utilize magnetic or optical tape or disks, solid state volatile or non-volatile memory, including random access memory (RAM), read only memory (ROM), electronically programmable memory (EPROM or EEPROM), or flash memory, as well as other volatile or non-volatile memory or data storage media.

Public network 10 represents any computer network and may have a variety of networked resources capable of data communication. For example, public network 10 may include routers, hubs, gateways, switches or other components.

Corporate network 16 may include a local area network (LAN) or a wide area network (WAN) that comprises a plurality of computing devices, such as desktop computers, laptops, workstations, PDAs, wireless devices, network-ready appliances, file servers, print servers or other devices. In this example, corporate network 16 also includes an instant virtual extranet (IVE) device 17. IVE device 17 allows an authorized remote user access to corporate network 16. For example, IVE device 17 may provide secure remote access to corporate network 16 for employees or business partners via user device 12. User device 12 connects to IVE 17 via a VPN over public network 10 and IVE 17 then communicates with servers or applications within corporate network 16. In this way, IVE 17 may serve as an access proxy. Other devices may be used to provide VPN connectivity to corporate network 16.

In accordance with the principles of the invention, client 13 of user device 12 establishes both an L4 based VPN tunnel 14 and an L3 based VPN tunnel 15 over public network 10. Although referred to, for exemplary purposes, as an L4 based VPN tunnel 14 and an L3 based VPN tunnel 15, client 13 may establish sets of inbound and outbound tunnels for both L3 and L4 VPN protocols.

VPN tunnels 14 and 15 allow packets conforming to other network protocols, such as IP packets, to be encapsulated within encrypted packet streams flowing between user device 12 and corporate network 16. Client 13 adaptively transitions between L4 VPN tunnel 14 and L3 VPN tunnel 15 in order to achieve a more efficient VPN performance when possible while maintaining consistent L3 connectivity from a variety of remote network environments.

For example, L4 based VPN tunnel 14 may comprise a SSL VPN that uses Layer 4 protocol Transmission Control Protocol (TCP) to tunnel IP packets. SSL VPNs can operate in most remote network environments because firewalls typically recognize the TCP header. Therefore, SSL VPN tunnel 14 may be allowed to work through firewalls within public network 10 in order to reach consumer network 16. In addition, SSL VPN tunnel 14 may also work through proxies. However, tunneling packets on top of the connection oriented TCP inherently introduces latency and performance problems within SSL VPN tunnel 14. This is because SSL VPNs essentially transport TCP packets over TCP packets, resulting in high TCP overhead and disruptive network behavior.

L3 based VPN tunnel 15 may comprise an IPSec VPN that uses Layer 3 protocol IP or User Datagram Protocol (UDP) to tunnel encrypted IP packets, i.e., Encapsulating Security Payload (ESP) packets. Since the packets are tunneled on top of the connection-less IP or UDP, IPSec VPN tunnel 15 does not suffer the performance drawbacks of TCP. However, IPSec VPN tunnel 15 cannot work though some firewalls. Without a TCP header, some firewalls may not recognize the IPSec packets, which may cause the firewalls to drop the IPSec packets before reaching corporate network 16. Additionally, IPSec VPN tunnel 15 may not work in restricted internet access scenarios where internet access is only available through a proxy.

Both the IPSec routing protocol and the SSL routing protocol have benefits and drawbacks and selecting one over the other may not be a trivial decision for a user. As described herein, client 13 supports both types of VPN tunnels and dynamically selects one of SSL VPN tunnel 14 and IPSec VPN tunnel 15 to transmit the encrypted packet streams without the user's knowledge. More specifically, client 13 adaptively fails over between SSL VPN tunnel 14 and IPSec VPN tunnel 15 based on the ability of IPSec VPN tunnel 15 to work through the remote network environment.

For example, a firewall may separate corporate network 16 from public network 10. In order to reach corporate network 16, encrypted packets on VPN tunnel 14 or 15 must pass through the firewall. However, IPSec VPN tunnel 15 may not be able to work through firewalls that do not allow IPSec traffic by default or that drop IPSec packets due to Network Address Translation (NAT) or for other reasons. In this case, client 13 may automatically (without requiring manual operation) detect that IPSec packets cannot reach IVE device 17 within corporate network 16 and dynamically failover to SSL VPN tunnel 14. IP packets are then encapsulated within SSL encrypted packet streams. SSL VPN tunnel 14 operates over TCP, which enables SSL VPN tunnel 14 to work through the firewall and reach IVE device 17 within corporate network 16.

In one embodiment, client 13 transmits IP packets through IPSec VPN tunnel 15. Client 13 also issues test or "keep-alive" messages over IPSec VPN tunnel 15 in order to determine whether the IP packets can successfully reach corporate network 16. When client 13 does not receive a reply to the test messages, client 13 fails over to SSL VPN tunnel 14 to transmit the IP packets. While transmitting the packets over SSL VPN tunnel 14, client 13 may continue to issue test messages over IPSec VPN tunnel 15. In the case where the remote network environment changes and L3 connectivity is reestablished for IPSec VPN tunnel 15, client 13 receives a reply to the test messages and transitions back to IPSec VPN tunnel 15.

In other embodiments, client 13 may initially transmit IP packets through SSL VPN tunnel 14. Since SSL VPN tunnel 14 works in more types of remote network environments than IPSec VPN tunnel 15, traffic is able to reach corporate network 16 while client 13 determines the usability of the more efficient IPSec VPN tunnel 15. When the L3 connectivity of IPSec VPN tunnel 15 is detected, client 13 transitions from SSL VPN tunnel 14 to IPSec VPN tunnel 15.

In some embodiments, client 13 establishes both SSL VPN tunnel 14 and IPSec VPN tunnel 15 between user device 12 and corporate network 16 upon user login to client 13. In this way, client 13 may immediately transition between the previously established SSL VPN tunnel 14 and IPSec VPN tunnel 15. In other embodiments, client 13 establishes only one of VPN tunnels 14 and 15 upon user login. For example, client 13 may initially establish IPSec VPN tunnel 15 and issue test messages to detect when IPSec packets are not reaching corporate network 16. When client 13 does not receive a reply to the test messages, client 13 first establishes SSL VPN tunnel 14 and then transitions the IP traffic onto SSL VPN tunnel 14.

Figure 2:
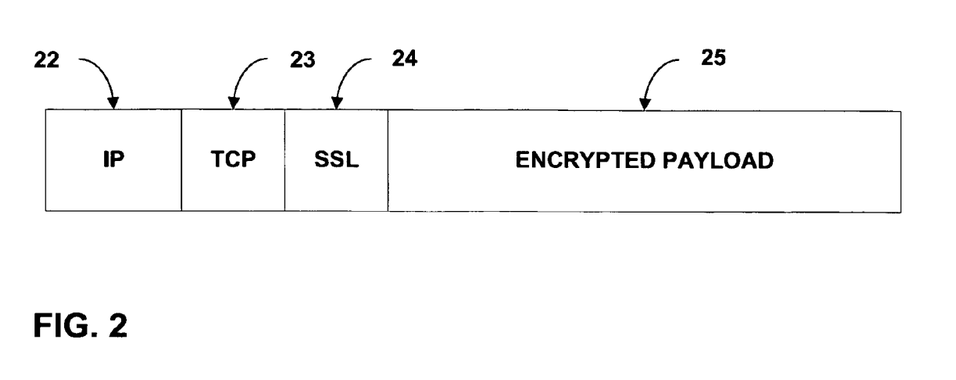
FIG. 2 illustrates an exemplary structure of a SSL encrypted packet.

FIG. 2 illustrates an exemplary structure of a SSL encrypted packet. The SSL encrypted packet may be securely transmitted through a SSL VPN tunnel established between a user device and a remote private network over a public network, such as the Internet. The SSL encrypted packet includes an IP header 22, a TCP header 23, a SSL header 24, and an encrypted payload 25. The SSL VPN tunnel allows packets conforming to other network protocols, such as IP packets, to be encapsulated within encrypted payload 25.

For example, the packet structure illustrated in FIG. 2 may be used to communicate IP packets through SSL VPN tunnel 14 between user device 12 and corporate device 16 over public network 10 from FIG. 1. Public network 10 may include routers and firewalls. When a router within public network 10 receives the encrypted SSL packet, the router examines IP header 22 and determines a next hop for the packet based on routing information stored within the router. When the SSL encrypted packet encounters a firewall within public network 10, the firewall may recognize TCP header 23 and allow the packet to pass through the firewall. Similarly, proxies may recognize TCP header 23 and allow the SSL encrypted packet to pass.

In this way, the SSL encrypted packet may be able to successfully traverse a variety of remote network environments. However, tunneling IP packets encapsulated within encrypted payload 25 on top of the connection oriented TCP may inherently introduce latency and performance problems within SSL VPN tunnels. Therefore, the SSL encrypted packet may comprise a reliable, but inefficient, packet structure.

Figure 3:
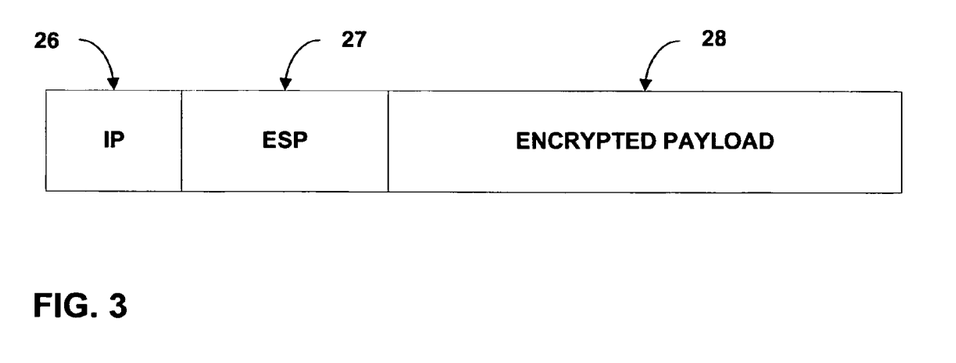
FIG. 3 illustrates an exemplary structure of an ESP encrypted packet.

FIG. 3 illustrates an exemplary structure of an ESP encrypted packet. The ESP encrypted packet may be securely transmitted through an IPSec VPN tunnel established between a user device and a remote private network over a public network, such as the Internet. The ESP encrypted packet includes an IP header 26, an ESP header 27, and an encrypted payload 28. The IPSec VPN tunnel allows packets conforming to other network protocols, such as IP packets, to be encapsulated within encrypted payload 28.

For example, the packet structure illustrated in FIG. 3 may be used to communicate IP packets through IPSec VPN tunnel 15 between user device 12 and corporate device 16 over public network 10 from FIG. 1. Public network 10 may includes routers and firewalls. When a router within public network 10 receives the encrypted ESP packet, the router examines IP header 26 and determines a next hop for the packet based on routing information stored within the router. When the ESP encrypted packet encounters a firewall within public network 10, the firewall may drop the packet because the ESP encrypted packet does not include a TCP header. Similarly, proxies may not recognize the ESP encrypted packet.

The ESP encrypted packet may only be able to successfully traverse certain remote network environments. However, since the IP packets encapsulated within encrypted payload 28 are tunneled on top of the connection-less IP or UDP, IPSec VPN tunnels do not suffer the performance drawbacks of TCP. In this way, the ESP encrypted packet may comprise a more efficient, but unreliable, packet structure.

Figure 4:
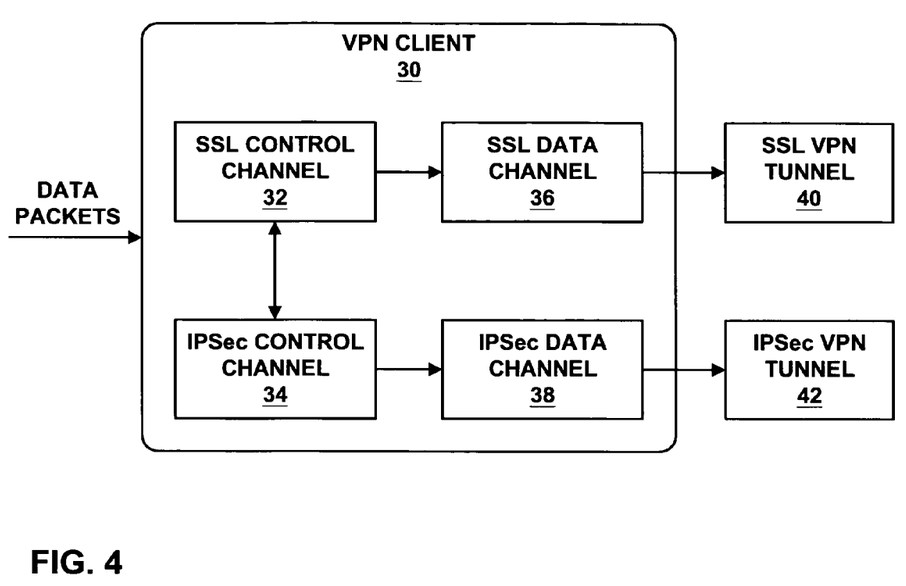
FIG. 4 is a block diagram illustrating an exemplary VPN client in accordance with an embodiment of the invention.

FIG. 4 is a block diagram illustrating an exemplary VPN client 30 in accordance with an embodiment of the invention. VPN client 30 may comprise a software client running on a user device, substantially similar to client 13 running on user device 12 from FIG. 1. In certain embodiments, VPN client 30 comprises either a PC VPN client that is fully integrated with the WINDOWS operating system or a Mac VPN client that is fully integrated with the MACINTOSH operating system. A processor, such as a DSP, may execute instructions stored in a computer-readable medium to perform various functions of VPN client 30 described herein.

VPN client 30 includes a SSL control channel 32, an IPSec control channel 34, a SSL data channel 36, and an IPSec data channel 38. VPN client 30 receives data packets, such as IP packets, for transmission to a remote private network, e.g., a corporate network, from the user device. In order to securely transmit the data packets across a public network, such as the Internet, VPN client 30 establishes a VPN tunnel between the user device and the corporate network. In the illustrated embodiment, SSL control channel 32 establishes and maintains SSL VPN tunnel 40 and IPSec control channel 34 establishes and maintains IPSec VPN tunnel 42. In general, each "channel" represents software for establishing and maintaining the respective communications.

Each of control channels 32 and 34 authenticates remote user login information before allowing the data packets from the user device to be transmitted to the corporate network. For example, control channels 32 and 34 may receive a user name and password or other credentials in order to perform authentication. After authenticating the user, SSL control channel 32 prepares an interface of the user device for SSL VPN tunnel 40, and IPSec control channel 34 prepares an interface of the user device for IPSec VPN tunnel 42.

Each of control channels 32 and 34 creates a special adapter on the user device. The corporate network allocates an IP address to each special adapter. The special adapters ensure that the data packets from the user device are directed to the proper one of SSL data channel 36 and IPSec data channel 38. In this way, VPN client 30 has control over the data packets transmitted on SSL VPN tunnel 40 and IPSec VPN tunnel 42.

VPN client 30 adaptively transitions between SSL VPN tunnel 40 and IPSec VPN tunnel 42 in order to achieve a more efficient VPN performance when possible while maintaining consistent L3 connectivity from a variety of remote network environments. VPN client 30 includes a signaling mechanism between SSL control channel 32 and IPSec control channel 34 capable of handling the transition from one of the VPN tunnels to the other. Control channels 32 and 34 choose on which of the tunnels to transmit the data packets over the public network. Control channels 32 and 34 negotiate which technology should be used and tell the corresponding one of data channels 36 and 38 that it is the active data channel.

For example, control channels 32 and 34 may initially decide to transmit the data packets on SSL VPN tunnel 40. SSL control channel 32 notifies SSL data channel 36 that it is the active data channel. SSL data channel 36 encapsulates the data packets within a SSL encrypted packet stream flowing on SSL VPN tunnel 40 between the user device and the corporate network.

Although SSL VPN tunnel 40 can operate in most remote network environments including firewalls and proxies, tunneling packets on top of the connection oriented TCP inherently introduces latency and performance problems within SSL VPN tunnel 40. Therefore, IPSec data channel 38 sends test messages on IPSec VPN tunnel 42 while SSL data channel 36 sends the data packets on SSL VPN tunnel 40. If IPSec data channel 38 receives a reply to the test messages, IPSec control channel 34 and SSL control channel 32 communicate and decide to failover from SSL VPN tunnel 40 to IPSec VPN tunnel 42. IPSec control channel 34 then notifies IPSec data channel 38 that it is the active channel. IPSec data channel 38 encapsulates the data packets within an ESP encrypted packet stream flowing on IPSec VPN tunnel 42 between the user device and the corporate network.

Since IPSec VPN tunnel 42 tunnels ESP packets on top of the connection-less IP or UDP, IPSec VPN tunnel 42 does not suffer the performance drawbacks of TCP. However, IPSec VPN tunnel 42 cannot work though some firewalls and proxies. Therefore, IPSec data channel 38 continues to send test messages along with the data packets on IPSec VPN tunnel 42. In this way, if the remote network environment changes and the data packets can no longer reach the corporate network on IPSec VPN tunnel 42, control channels 32 and 34 can decide to translate back to the SSL VPN tunnel 40.

Figure 5:
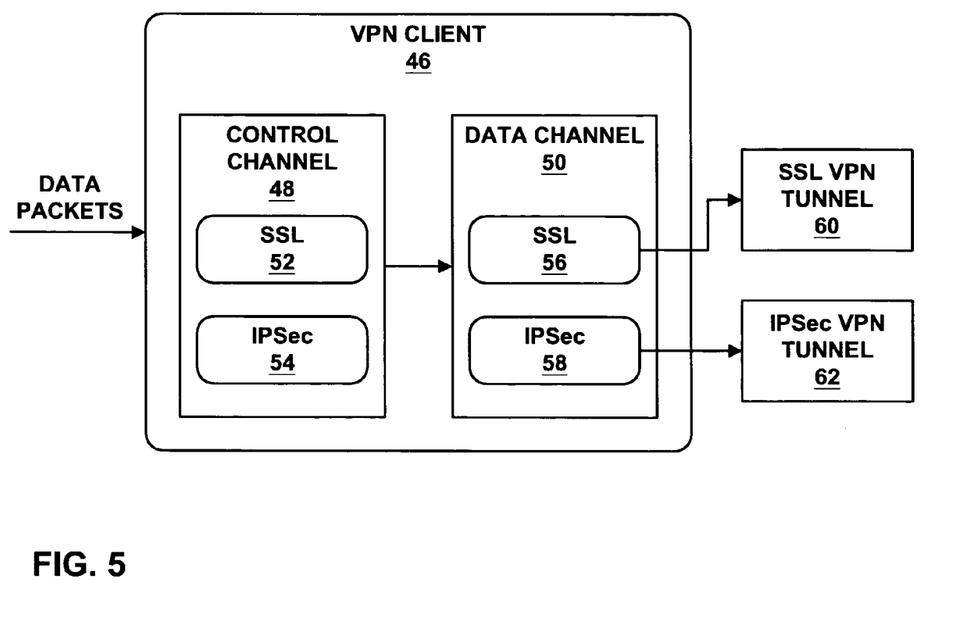
FIG. 5 is a block diagram illustrating an exemplary VPN client in accordance with another embodiment of the invention.

FIG. 5 is a block diagram illustrating an exemplary VPN client 46 in accordance with another embodiment of the invention. VPN client 46 may comprise a software client running on a user device, substantially similar to client 13 running on user device 12 from FIG. 1. VPN client 46 comprises either a PC VPN client that is fully integrated with the WINDOWS operating system or a Mac VPN client that is fully integrated with the MACINTOSH operating system. A processor, such as a general purpose processor, may execute instructions stored in a computer-readable medium to perform various functions of VPN client 46 described herein.

VPN client 46 operates substantially similar to VPN client 30 described in reference to FIG. 4. However, VPN client 46 includes a single control channel 48 and a single data channel 50. Control portions of tunneling protocols SSL 52 and IPSec 54 execute within control channel 48. Data portions of tunneling protocols SSL 56 and IPSec 58 execute within data channel 50. VPN client 46 receives data packets, such as IP packets, for transmission to a remote private network, e.g., a corporate network, from the user device. In order to securely transmit the data packets across a public network, such as the Internet, VPN client 46 establishes a VPN tunnel between the user device and the corporate network. In the illustrated embodiment, control channel 48 establishes and maintains both SSL VPN tunnel 60 and IPSec VPN tunnel 62.

Control channel 48 authenticates remote user login information before allowing the data packets from the user device to be transmitted to the corporate network. For example, control channel 48 may receive a user name and password or other credentials in order to perform authentication. After authenticating the user, control channel 48 utilizes SSL 52 to prepare an interface of the user device for SSL VPN tunnel 60, and utilizes IPSec 54 to prepare an interface of the user device for IPSec VPN tunnel 62.

Control channel 48 creates a special adapter on the user device. The corporate network allocates an IP address to the special adapter. The special adapter ensures that the data packets from the user device are directed to data channel 50. In this way, VPN client 46 has control over the data packets transmitted on SSL VPN tunnel 60 and IPSec VPN tunnel 62.

VPN client 46 adaptively transitions between SSL VPN tunnel 60 and IPSec VPN tunnel 62 in order to achieve a more efficient VPN performance when possible while maintaining consistent L3 connectivity from a variety of remote network environments. VPN client 46 includes a signaling mechanism between tunneling protocols SSL 52 and IPSec 54 to render control channel 48 capable of handling the transition from one of the VPN tunnels to the other. Control channel 48 chooses on which of the tunnels to transmit the data packets over the public network. Tunneling protocols SSL 52 and IPSec 54 negotiate which technology should be used and control channel 48 tells data channel 50 which one of tunneling protocols SSL 56 and IPSec 58 is active.

For example, control channel 48 may initially decide to transmit the data packets on SSL VPN tunnel 60. Control channel 48 notifies data channel 50 that tunneling protocol SSL 56 is the active protocol. Data channel 50 encapsulates the data packets within a SSL encrypted packet stream flowing on SSL VPN tunnel 60 between the user device and the corporate network.

Although SSL VPN tunnel 60 can operate in most remote network environments including firewalls and proxies, tunneling packets on top of the connection oriented TCP inherently introduces latency and performance problems within SSL VPN tunnel 60. Therefore, data channel 50 also sends test messages on IPSec VPN tunnel 62 while simultaneously sending the data packets on SSL VPN tunnel 60. If data channel 50 receives a reply to the test messages on IPSec VPN tunnel 62, control channel 48 decides to failover from SSL VPN tunnel 60 to IPSec VPN tunnel 62. Control channel 48 then notifies data channel 50 that tunneling protocol IPSec 58 is the active protocol. Data channel 50 encapsulates the data packets within an ESP encrypted packet stream flowing on IPSec VPN tunnel 62 between the user device and the corporate network.

Since IPSec VPN tunnel 62 tunnels ESP packets on top of the connection-less IP or UDP, IPSec VPN tunnel 62 does not suffer the performance drawbacks of TCP. However, IPSec VPN tunnel 62 cannot work though some firewalls and proxies. Therefore, data channel 50 continues to send test messages along with the data packets on IPSec VPN tunnel 62. In this way, if the remote network environment changes and the data packets can no longer reach the corporate network on IPSec VPN tunnel 62, control channel 48 can decide to translate back to the SSL VPN tunnel 60.

Figure 6:
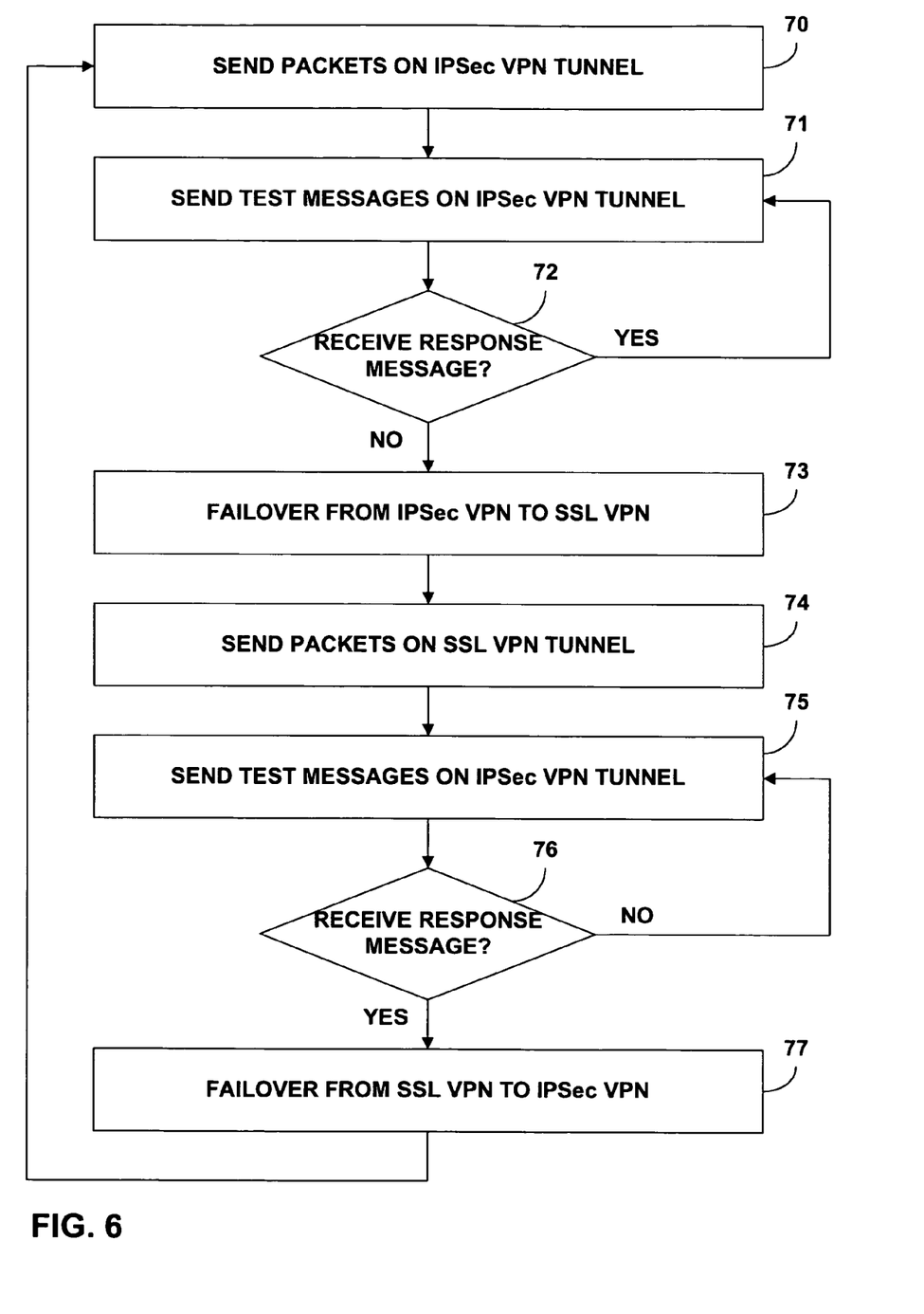
FIG. 6 is a flow chart illustrating an exemplary process of dynamically selecting a tunneling protocol.

FIG. 6 is a flow chart illustrating an exemplary process of dynamically selecting a tunneling protocol. The process will be described herein relative to client 13 from FIG. 1. Client 13 is included within user device 12 and securely transmits data packets between user device 12 and remote corporate network 16 on either SSL VPN tunnel 14 or IPSec VPN tunnel 15. In other embodiments, the process may be performed by another type of client, such as VPN client 30 from FIG. 4 or VPN client 46 from FIG. 5.

Client 13 sends data packets from user device 12 on IPSec VPN tunnel 15 (70). At the same time, client 13 sends test messages on IPSec VPN tunnel 15 to verify that L3 connectivity is maintained for IPSec VPN tunnel 15 (71). If client 13 receives a reply to the test messages on IPSec VPN tunnel 15 (yes branch of 72), then the data packets are reaching IVE 17 within corporate network 16. Client 13 continues to send the test messages on IPSec VPN tunnel 15 (71).

If client 13 does not receive a reply to the test messages on IPSec VPN tunnel 15 (no branch of 72), then the data packets are not reaching IVE 17 within corporate network 16. For example, IPSec VPN tunnel 15 may be unable to work through a firewall included in public network 10. Client 13 fails over from IPSec VPN tunnel 15 to SSL VPN tunnel 14 (73). Client 13 then sends the data packets on SSL VPN tunnel 14 (74). Client 13 continues to send test messages on IPSec VPN tunnel 15 (75) to determine when L3 connectivity is restored for IPSec VPN tunnel 15.

If client 13 does not receive a reply to the test messages on IPSec VPN tunnel 15 (no branch of 76), client 13 continues to send the data packets on SSL VPN tunnel 14 and continues to send the test messages on IPSec VPN tunnel 15 (75). If client 13 receives a reply to the test messages on IPSec VPN tunnel 15 (yes branch of 76), client 13 fails over from SSL VPN tunnel 14 to IPSec VPN tunnel 15 (77). Client 13 then sends the data packets on IPSec VPN tunnel 15 (70).

Figure 7:
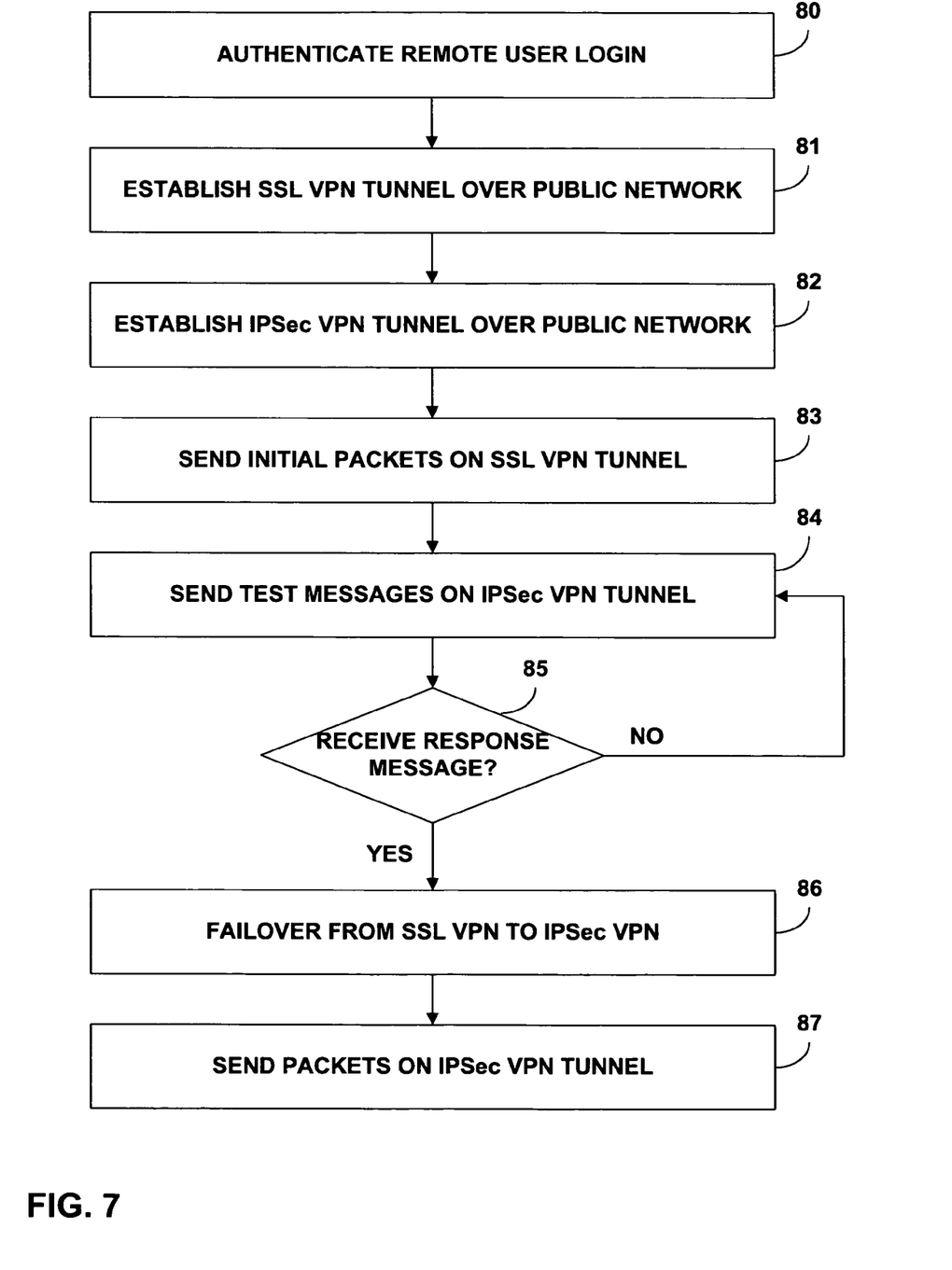
FIG. 7 is a flow chart illustrating an exemplary process of failing over from a SSL VPN to an IPSec VPN upon user login.

FIG. 7 is a flow chart illustrating an exemplary process of failing over from a SSL VPN to an IPSec VPN upon user login. The process will be described herein relative to VPN client 30 from FIG. 4. VPN client 30 may be included within a user device to securely transmit data packets between the user device and a remote private network, such as a corporate network. In other embodiments, the process may be performed by another type of VPN client, such as VPN client 46 from FIG. 5.

SSL control channel 32 and IPSec control channel 34 authenticate remote user login information to ensure that a user of the user device is allowed to send and receive data packets with the corporate network (80). SSL control channel 32 establishes SSL VPN tunnel 40 between the user device and the corporate network over a public network, such as the Internet (81). In addition, IPSec control channel 34 establishes IPSec VPN tunnel 42 over the public network (82).

SSL VPN tunnel 40 may work in more types of remote network environments than IPSec VPN tunnel 42. Therefore, SSL control channel 32 and IPSec control channel 34 decide to initially send the data packets from the user device over SSL VPN tunnel 40. SSL control channel 32 notifies SSL data channel 36 that it is the active data channel. SSL data channel 36 then transmits the initial data packets on SSL VPN tunnel 40 (83). At the same time, IPSec data channel 38 sends test messages on IPSec VPN tunnel 42 to determine the L3 connectivity of the more efficient IPSec VPN tunnel 42 (84).

If IPSec data channel 38 does not receive a reply to the test messages on IPSec VPN tunnel 42 (no branch of 85), then L3 connectivity has not yet been established for IPSec VPN tunnel 42. IPSec data channel 38 continues to send the test messages on IP Sec VPN tunnel 42 (84). If IPSec data channel 38 receives a reply to the test messages on IPSec VPN tunnel 42 (yes branch of 85), then L3 connectivity has been established for IPSec VPN tunnel 42. SSL control channel 32 and IPSec control channel 34 decide to failover from SSL VPN tunnel 40 to IPSec VPN tunnel 42 (86). IPSec control channel 34 notifies IPSec data channel 38 that it is the active data channel. IPSec data channel 38 then transmits the data packets on IPSec VPN tunnel 42 (87).

Figure 8:
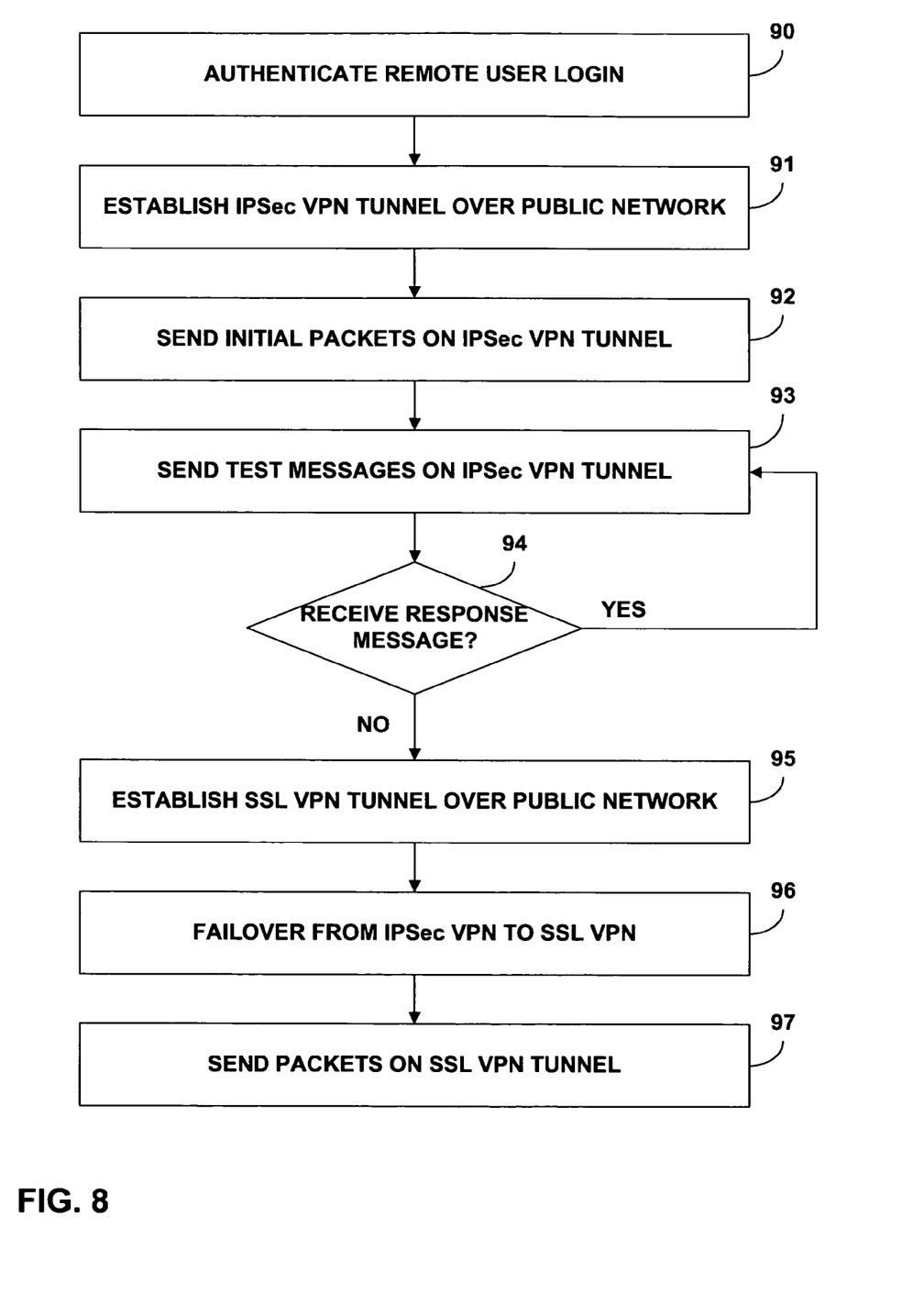
FIG. 8 is a flow chart illustrating an exemplary process of failing over from an IPSec VPN to a SSL VPN upon user login.

FIG. 8 is a flow chart illustrating an exemplary process of failing over from an IPSec VPN to a SSL VPN upon user login. The process will be described herein relative to VPN client 30 from FIG. 4. VPN client 30 may be included within a user device to securely transmit data packets between the user device and a remote private network, such as a corporate network. In other embodiments, the process may be performed by another type of VPN client, such as VPN client 46 from FIG. 5.

SSL control channel 32 and IPSec control channel 34 authenticate remote user login information to ensure that a user of the user device is allowed to send and receive data packets with the corporate network (90). IPSec control channel 34 establishes IPSec VPN tunnel 42 over a public network, such as the Internet (91). IPSec control channel 34 notifies IPSec data channel 38 that it is the active data channel. IPSec data channel 38 then transmits the initial data packets on IPSec VPN tunnel 42 (92). At the same time, IPSec data channel 38 sends test messages on IPSec VPN tunnel 42 to verify that L3 connectivity is maintained for IPSec VPN tunnel 42 (93).

If IPSec data channel 38 receives a reply to the test messages on IPSec VPN tunnel 42 (yes branch of 94), then the data packets are reaching the corporate network. IPSec data channel 38 continues to send the data packets and continues to send the test messages on IPSec VPN tunnel 42 (93). If IPSec data channel 38 does not receive a reply to the test messages on IPSec VPN tunnel 42 (no branch of 94), then the data packets are no longer reaching the corporate network. SSL control channel 32 establishes SSL VPN tunnel 40 over the public network (95). SSL control channel 32 and IPSec control channel 34 decide to failover from IPSec VPN tunnel 42 to SSL VPN tunnel 40 (96). SSL control channel 32 then notifies SSL data channel 36 that it is the active data channel. SSL data channel 36 transmits the data packets on SSL VPN tunnel 40 (97).

Various embodiments of the invention have been described. For example, principles of the invention have been described for failing over between a L3 based network tunnel and a L4 based network tunnel. The network tunnels are described herein as VPN tunnels; however the invention should not be limited in this respect. In the embodiments described above, a VPN client within a user device dynamically transitions between an IPSec (L3 based) VPN tunnel and a SSL (L4 based) VPN tunnel to securely transmit data packets over a public network. The VPN client may be fully integrated within either a WINDOWS or a MACINTOSH operating system on the user device. In this way, the VPN client may achieve a more efficient VPN performance when possible while maintaining consistent L3 connectivity from a variety of remote network environments. These and other embodiments are within the scope of the following claims.

The invention claimed is:

1. A method for controlling an active data channel of a user device for a virtual private network (VPN), the method comprising:

executing a virtual private network (VPN) software client within an operating system of a user device;

authenticating a user of the user device to a remote private network with the VPN software client;

after authenticating the user, establishing, with the VPN software client, both a layer three (L3) based tunnel and a layer four (L4) based tunnel over a network from the user device to the remote private network, wherein establishing both the L3 based and L4 based tunnels comprises creating a respective adapter for each of the tunnels on the user device;

using the L4 based tunnel as an active data channel for the VPN by transmitting data packets to the remote private network over the L4 based tunnel;

while using the L4 based tunnel as the active data channel for the VPN by transmitting data packets to the remote private network over the L4 based tunnel, transmitting a test message with the VPN software client with the L3 based tunnel using the respective adapter of the L3 based tunnel and setting the L3 based tunnel as the active data channel for the VPN when a reply to the test message is received from the remote private network; and after setting the L3 based tunnel as the active data channel, transmitting data packets to the remote private network with the VPN software client with the L3 based tunnel using the respective adapter of the L3 based tunnel and setting the L4 based tunnel as a non-active data channel.

2. The method of claim 1, wherein the L3 based tunnel comprises an Internet Protocol Security (IPSec) tunnel.

3. The method of claim 2, wherein transmitting an encapsulated communication with the L3 based tunnel comprises:
encapsulating data packets within an Encapsulation Security Protocol (ESP) encrypted packet stream; and
tunneling the ESP packet stream using the Internet Protocol (IP) or the User Datagram Protocol (UDP).

4. The method of claim 1, wherein the L4 based tunnel comprises a Secure Sockets Layer (SSL) tunnel.

5. The method of claim 4, further comprising:
encapsulating data packets within a SSL encrypted packet stream; and
tunneling the SSL packet stream using the Transport Control Protocol (TCP).

6. The method of claim 1, wherein determining whether communication with the L3 based tunnel through the network is successful comprises sending test messages on the L3 based tunnel with the VPN software client of the user device.

7. The method of claim 1, further comprising:
authenticating user login information; and
sending data packets from the authenticated user across the network on one of the L3 based tunnel or the L4 based tunnel.

8. The method of claim 7, wherein the data packets comprise L3 data packets.

9. The method of claim 8, wherein the L3 data packets comprise Internet Protocol (IP) data packets.

10. A non-transitory computer-readable storage medium comprising instructions that cause a programmable processor to:
execute a virtual private network (VPN) software client within an operating system of a user device;
authenticate a user of the user device to a remote private network with the VPN software client;
after authenticating the user, establish a layer three (L3) based tunnel and a layer four (L4) based tunnel over a network from the user device to the remote private network;

use the L4 based tunnel as an active data channel for the VPN by transmitting data packets to the remote private network over the L4 based tunnel;

while using the L4 based tunnel as the active data channel for the VPN by transmitting data packets to the remote private network over the L4 based tunnel, transmit a test message with the VPN software client with the L3 based tunnel and set the L3 based tunnel as the active data channel when a reply to the test message is received from the remote private network prior to failure of the L4 based tunnel; and after setting the L3 based tunnel as the active data channel, transmit data packets to the remote private network with the VPN software client with the L3 based tunnel using the L3 based tunnel and setting the L4 based tunnel as a non-active data channel.

11. The non-transitory computer-readable storage medium of claim 10, wherein the L3 based tunnel comprises an Internet Protocol Security (IPSec) tunnel.

12. The non-transitory computer-readable storage medium of claim 11, further comprising instructions that cause the programmable processor to:
encapsulate data packets within an Encapsulation Security Protocol (ESP) encrypted packet stream; and
tunnel the ESP packet stream using the Internet Protocol (IP) or the User Datagram Protocol (UDP).

13. The non-transitory computer-readable storage medium of claim 10, wherein the L4 based tunnel comprises a Secure Sockets Layer (SSL) tunnel.

14. The non-transitory computer-readable storage medium of claim 13, further comprising instructions that cause the programmable processor to:
encapsulate data packets within a SSL encrypted packet stream; and
tunnel the SSL packet stream using the transport Control Protocol (TCP).

15. The non-transitory computer-readable storage medium of claim 10, further comprising instructions that cause the programmable processor to:
authenticate user login information; and
send data packets from the authenticated user across the network on one of the L3 based tunnel and the L4 based tunnel.

16. A device comprising:
a processor;
an operating system executing on the processor;
a virtual private network (VPN) software client integrated with the operating system that establishes both a layer three (L3) based VPN tunnel and a layer four (L4) based VPN tunnel over a network from the device to a remote private network,
wherein the VPN software client integrated with the operating system uses the L4 based VPN tunnel as an active data channel to send initial data packets by transmitting data packets to the remote private network over the L4 tunnel,
wherein, while using the L4 based VPN tunnel as the active data channel by transmitting data packets to the remote private network over the L4 based VPN tunnel, the VPN software client sends a test message on the L3 based VPN tunnel,
wherein, while using the L4 based VPN tunnel as the active data channel by transmitting data packets to the remote private network over the L4 based VPN tunnel, the VPN software client sets the L34 based VPN tunnel as the active data channel for the VPN when a reply to the test message is received from the remote private network, and wherein, after setting the L3 based tunnel as the active data channel, the VPN software client transmits data packets from the device to the remote private network using the respective adapter for the L3 based VPN tunnel and sets the L4 based tunnel as a non-active data channel.

17. The device of claim 16, wherein the VPN software client includes a control channel that establishes the L3 based VPN tunnel and the L4 based VPN tunnel between the device and the remote private network.

18. The device of claim 16, wherein the VPN software client includes a single control channel for both a L3 based tunneling protocol and a L4 based tunneling protocol, and a single data channel for both the L3 based tunneling protocol and the L4 based tunneling protocol.

19. The device of claim 18, further comprising a signaling mechanism between the L3 based tunneling protocol and the L4 based tunneling protocol within the control channel.

20. The device of claim 16, wherein the client includes a L3 based control channel, a L4 based control channel, a L3 based data channel, and a L4 based data channel.

21. The device of claim 20, wherein the L3 based control channel and the L4 based control channel negotiate to decide on which of the L3 based tunnel and the L4 based tunnel to send data packets, and the control channel associated with the selected tunnel notifies the data channel of the selected tunnel that it is the active data channel.

22. The device of claim 20, wherein the L3 based control channel and the L4 based control channel negotiate to decide on which of the L3 based tunnel and the L4 based tunnel to send data packets, and the control channel associated with the selected tunnel notifies the associated data channel that it is the active data channel.

23. The device of claim 16, wherein the device includes:
 a control channel that authenticates login information from a user; and
 a data channel that sends data packets from the authenticated user across the network on one of the L3 based tunnel and the L4 based tunnel.

24. The device of claim 23, wherein the data packets comprise L3 data packets.

25. The device of claim 24, wherein the L3 data packets comprises Internet Protocol (IP) data packets.

26. The device of claim 16, wherein the device comprises one of a desktop computer, a laptop, a workstation, a personal digital assistant (PDA), a wireless device, a network-ready appliance, a file server, or a print server.

27. The method of claim 1, further comprising allocating a separate IP address to each adapter on the user device.

28. A method for controlling an active data channel of a user device for a virtual private network (VPN), the method comprising:
 executing a virtual private network (VPN) software client within an operating system of a user device;
 authenticating a user of the user device to a remote private network with the VPN software client;
 after authenticating the user, establishing, with the VPN software client, a first tunnel and a second tunnel over a network from the user device to the remote private network, wherein the first tunnel of the VPN uses a Transmission Control Protocol (TCP) as a connection oriented transport protocol to communicate tunneled packets to the remote private network, and wherein the second tunnel of the VPN uses a User Datagram Protocol as a connectionless transport protocol to communicate tunneled packets to the remote private network;
 using the first tunnel as an active data channel for the VPN for transmitting data packets to the remote private network using the connection oriented transport protocol;
 while using the first tunnel as the active data channel for the VPN by transmitting data packets to the remote private network over the first tunnel, transmitting a test message with the VPN software client with the second tunnel and setting the second tunnel as the active data channel for the VPN when a reply to the test message is received from the remote private network; and
 after setting the second tunnel as the active data channel, transmitting data packets to the remote private network with the VPN software client with the second tunnel using the connectionless transport protocol and setting the first tunnel as a non-active data channel.

* * * * *